(12) United States Patent
Takei

(10) Patent No.: US 10,348,148 B2
(45) Date of Patent: Jul. 9, 2019

(54) STATOR FOR ROTATING ELECTRIC MACHINE

(71) Applicant: DENSO CORPORATION, Kariya, Aichi-pref. (JP)

(72) Inventor: Toshihiro Takei, Kariya (JP)

(73) Assignee: DENSO CORPORATION, Kariya (JP)

( * ) Notice: Subject to any disclaimer, the term of this patent is extended or adjusted under 35 U.S.C. 154(b) by 80 days.

(21) Appl. No.: 15/462,177

(22) Filed: Mar. 17, 2017

(65) Prior Publication Data

US 2017/0271937 A1  Sep. 21, 2017

(30) Foreign Application Priority Data

Mar. 17, 2016 (JP) .................. 2016-053857

(51) Int. Cl.
*H02K 3/30* (2006.01)
*H02K 3/28* (2006.01)
*H02K 11/25* (2016.01)
*H02K 3/12* (2006.01)
*H02K 3/38* (2006.01)

(52) U.S. Cl.
CPC ............. *H02K 3/28* (2013.01); *H02K 3/12* (2013.01); *H02K 3/30* (2013.01); *H02K 3/38* (2013.01); *H02K 11/25* (2016.01); *H02K 2203/06* (2013.01)

(58) Field of Classification Search
CPC .. H02K 3/00; H02K 3/04; H02K 3/12; H02K 3/28; H02K 3/30; H02K 3/38; H02K 3/50; H02K 11/25; H02K 15/04; H02K 15/0478; H02K 15/066
See application file for complete search history.

(56) References Cited

U.S. PATENT DOCUMENTS

| 6,501,205 | B1 | 12/2002 | Asao et al. | |
|---|---|---|---|---|
| 2002/0180299 | A1* | 12/2002 | Oohashi | H02K 3/28 310/184 |
| 2003/0102736 | A1* | 6/2003 | Shichijyo | H02K 3/50 310/68 D |
| 2003/0129856 | A1* | 7/2003 | Takizawa | H02K 3/50 439/13 |
| 2003/0218394 | A1* | 11/2003 | Hashiba | H02K 3/12 310/71 |

(Continued)

FOREIGN PATENT DOCUMENTS

| JP | 2002-218689 A | 8/2002 |
|---|---|---|
| JP | 2015-61465 A | 3/2015 |

*Primary Examiner* — Tran N Nguyen
(74) *Attorney, Agent, or Firm* — Oliff PLC

(57) ABSTRACT

A stator includes an annular stator core and a multi-phase stator coil. The stator core has slots arranged in a circumferential direction thereof. The stator coil is comprised of phase windings that are mounted on the stator core so as to be received in the slots of the stator core. The stator coil has an annular coil end part protruding axially outward from an axial end face of the stator core. The stator coil includes, at least, two lead wires and a joint. Each of the lead wires is connected with one of the phase windings of the stator coil and led out from a radially inner periphery of the coil end part. At the joint, distal ends of the lead wires are joined to each other. Adjoining portions of the lead wires, which adjoin each other, are arranged radially inside a radially-inner peripheral surface of the coil end part.

7 Claims, 8 Drawing Sheets

(56) References Cited

U.S. PATENT DOCUMENTS

| | | |
|---|---|---|
| 2009/0001841 A1 | 1/2009 | Naganawa et al. |
| 2009/0200888 A1 | 8/2009 | Tanaka et al. |
| 2011/0175483 A1* | 7/2011 | Koike ...................... H02K 3/12 |
| | | 310/201 |
| 2011/0248585 A1* | 10/2011 | Wang ....................... H02K 3/12 |
| | | 310/71 |
| 2013/0270973 A1* | 10/2013 | Ikemoto ............. H02K 11/0047 |
| | | 310/68 C |
| 2015/0061434 A1* | 3/2015 | Asano ...................... H02K 3/12 |
| | | 310/71 |
| 2016/0254717 A1 | 9/2016 | Hoshina et al. |
| 2017/0054340 A1 | 2/2017 | Tanaka et al. |

* cited by examiner

STATOR FOR ROTATING ELECTRIC MACHINE

CROSS-REFERENCE TO RELATED APPLICATION

This application is based on and claims priority from Japanese Patent Application No. 2016-53857 filed on Mar. 17, 2016, the content of which is hereby incorporated by reference in its entirety into this application.

BACKGROUND

1 Technical Field

The present invention relates to stators for rotating electric machines that are used in, for example, motor vehicles as electric motors and electric generators.

2 Description of Related Art

There are known rotating electric machines that are used in motor vehicles as electric motors and electric generators. These rotating electric machines generally include a rotor and a stator. The rotor is rotatably supported by a housing. The stator includes an annular stator core and a three-phase stator coil. The stator core is disposed in radial opposition to the rotor and has a plurality of slots arranged in a circumferential direction thereof. The stator coil is comprised of a plurality of phase windings that are mounted on the stator core so as to be received in the slots of the stator core. The stator coil has a pair of annular coil end parts that protrude axially outward respectively from an opposite pair of axial end faces of the stator core.

Moreover, there is disclosed an arrangement of lead wires in Japanese Patent No. JP5647285B2 and Japanese Patent Application Publication No. JP2009011116A (to be respectively referred to as Patent Documents 1 and 2 hereinafter). Specifically, according to the disclosure of Patent Documents 1 and 2, lead wires, such as input wires, output wires and neutral wires of the stator coil, are led out from a radially inner periphery of one of the coil end parts of the stator coil, arranged to extend across the coil end part to the radially outside of the coil end part and joined to other corresponding electric conductor wires on the radially outside of the coil end part.

However, the above arrangement of the lead wires disclosed in Patent Documents 1 and 2 has the following problems.

That is, since the lead wires, which are led out from the radially inner periphery of the coil end part, are arranged to extend across the coil end part to the radially outside of the coil end part, the extending lengths of the lead wires from the radially inner periphery of the coil end part to the corresponding electric conductor wires become large. Consequently, the weights of the lead wires are increased. Moreover, since the lead wires are arranged to hang over the coil end part, the rigidities of the lead wires are lowered. As a result, the natural frequencies of the lead wires are lowered. When the natural frequencies are low, the lead wires may resonate with vibration accompanying rotation of a vehicle engine; thus excessive stress may be induced in joints where the lead wires are jointed to the corresponding electric conductor wires, resulting in failure (e.g., breakage or disconnection) of the joints.

SUMMARY

According to exemplary embodiments, there is provided a stator for a rotating electric machine. The stator includes an annular stator core and a multi-phase stator coil. The stator core has a plurality of slots arranged in a circumferential direction thereof. The stator coil is comprised of a plurality of phase windings that are mounted on the stator core so as to be received in the slots of the stator core. The stator coil has an annular coil end part that protrudes axially outward from an axial end face of the stator core. Further, the stator coil includes, at least, two lead wires and a joint. Each of the lead wires is connected with one of the phase windings of the stator coil and led out from a radially inner periphery of the coil end part. At the joint, distal ends of the lead wires are joined to each other. Adjoining portions of the lead wires, which adjoin each other, are arranged radially inside a radially-inner peripheral surface of the coil end part.

With the above arrangement, it is possible to minimize the extending lengths of the lead wires from the radially inner periphery of the coil end part to the abutting portions. Consequently, it is possible to reduce the weights of the lead wires, thereby setting the natural frequencies of the lead wires to be outside of a normal frequency of vibration in a vehicle. As a result, it is possible to reduce stress induced in the joint due to vibration in the vehicle, thereby preventing failure (e.g., breakage or disconnection) of the joint.

It is preferable that the joint is also arranged radially inside the radially-inner peripheral surface of the coil end part.

The phase windings of the stator coil which are respectively connected with the lead wires may preferably belong to different phases.

Extending lengths of the lead wires may be different from each other. The adjoining portions of the lead wires may be preferably fixed to each other by a resin member.

The stator coil may include first and second joints at each of which at least two lead wires are joined to each other. Each of the lead wires is connected with one of the phase windings of the stator coil and led out from the radially inner periphery of the coil end part. The lead wires joined at the first joint extend axially outward from an axial end face of the coil end part of the stator coil for a first length. The lead wires joined at the second joint extend axially outward from the axial end face of the coil end part of the stator coil for a second length. It is preferable that the first and second lengths are set to be different from each other.

An elastic member may be mounted on the joint. The elastic member may be preferably arranged in abutment with a housing of the rotating electric machine.

Further, the elastic member may be preferably formed of a material having a lower thermal conductivity than electric conductors of the lead wires. Between the elastic member and the joint, there may be preferably arranged a temperature-sensing element to sense temperature at the joint.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings.

DESCRIPTION OF EMBODIMENTS

Figure 1:
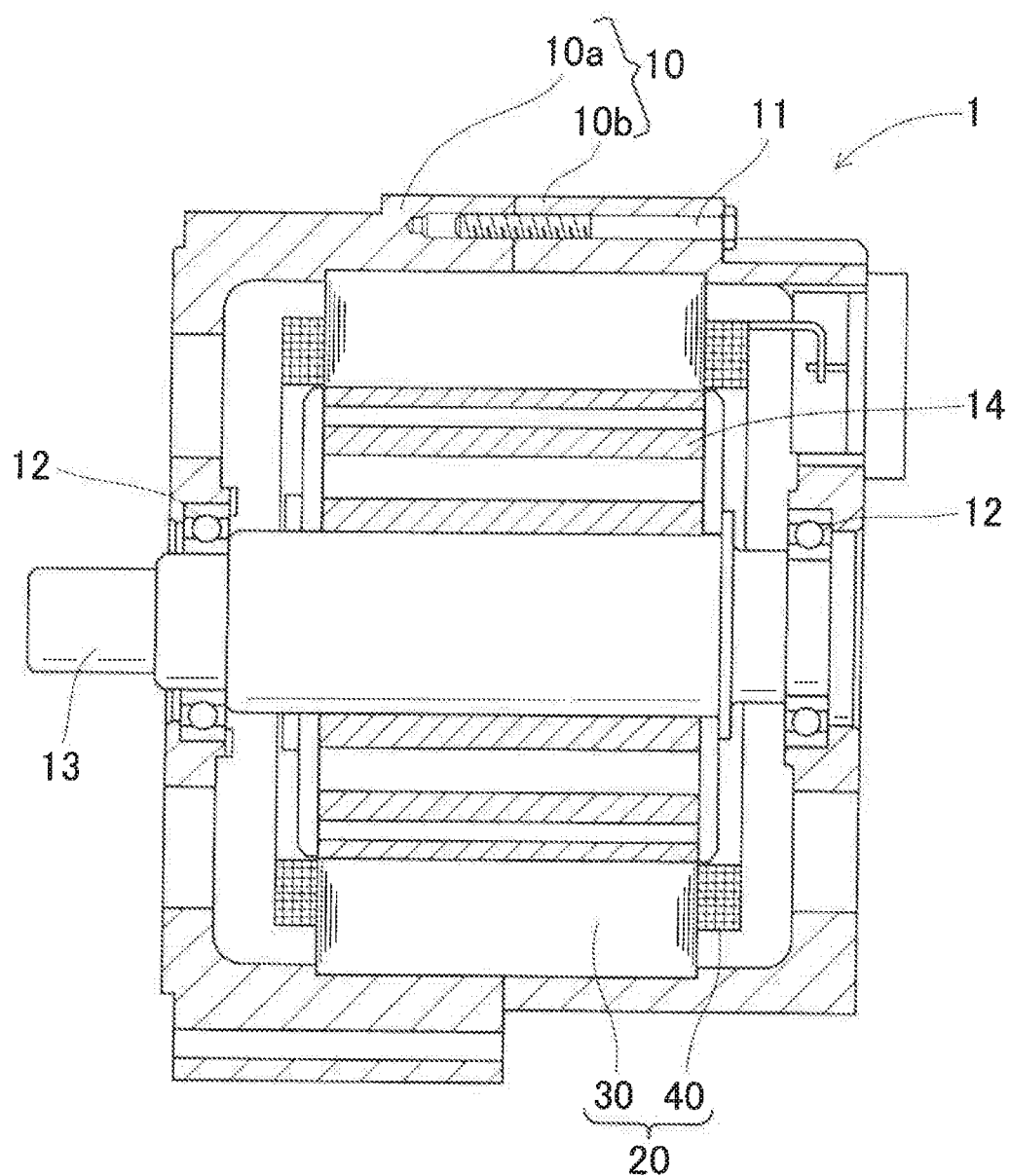
FIG. 1 is a partially cross-sectional view, taken along an axial direction, of a rotating electric machine which includes a stator according to a first embodiment.

Exemplary embodiments and their modifications will be described hereinafter with reference to FIGS. 1-12. It should be noted that for the sake of clarity and understanding, identical components having identical functions throughout the whole description have been marked, where possible, with the same reference numerals in each of the figures and that for the sake of avoiding redundancy, descriptions of identical components will not be repeated.

First Embodiment

FIG. 1 shows the overall configuration of a rotating electric machine 1 which includes a stator 20 according to a first embodiment.

The rotating electric machine 1 is designed to be used in a motor vehicle, such as a passenger car or truck, as an electric motor.

As shown in FIG. 1, the rotating electric machine 1 further includes a housing 10, a rotating shaft 13 and a rotor 14 in addition to the stator 20.

The housing 10 has a substantially hollow cylindrical shape with both axial ends thereof closed. The housing 10 is comprised of a pair of cup-shaped housing pieces 10a and 10b. The housing pieces 10a and 10b are fastened, for example by bolts 11, into one piece with open ends thereof opposed to each other. The housing 10 has a pair of bearings 12 provided respectively in opposite axial end walls thereof.

The rotating shaft 13 is rotatably supported by the housing 10 via the pair of bearings 12.

The rotor 14 is received in the housing 10. The rotor 14 is fixedly fitted on an axially central part of the rotating shaft 13 so as to rotate together with the rotating shaft 13. In a radially outer peripheral part of the rotor 14, there are arranged a plurality of permanent magnets at predetermined intervals in a circumferential direction of the rotor 14. The permanent magnets form a plurality of magnetic poles on the radially outer periphery of the rotor 14 facing the radially inner periphery of the stator 20 that is fixed in the housing 10 so as to surround the radially outer periphery of the rotor 14. The magnetic poles are arranged in the circumferential direction of the rotor 14 at predetermined intervals so that the polarities of the magnetic poles alternate between north and south in the circumferential direction.

The stator 20 includes an annular (or hollow cylindrical) stator core 30 that is disposed radially outside the rotor 14 and a three-phase stator coil 40 mounted on the stator core 30.

Figure 2:
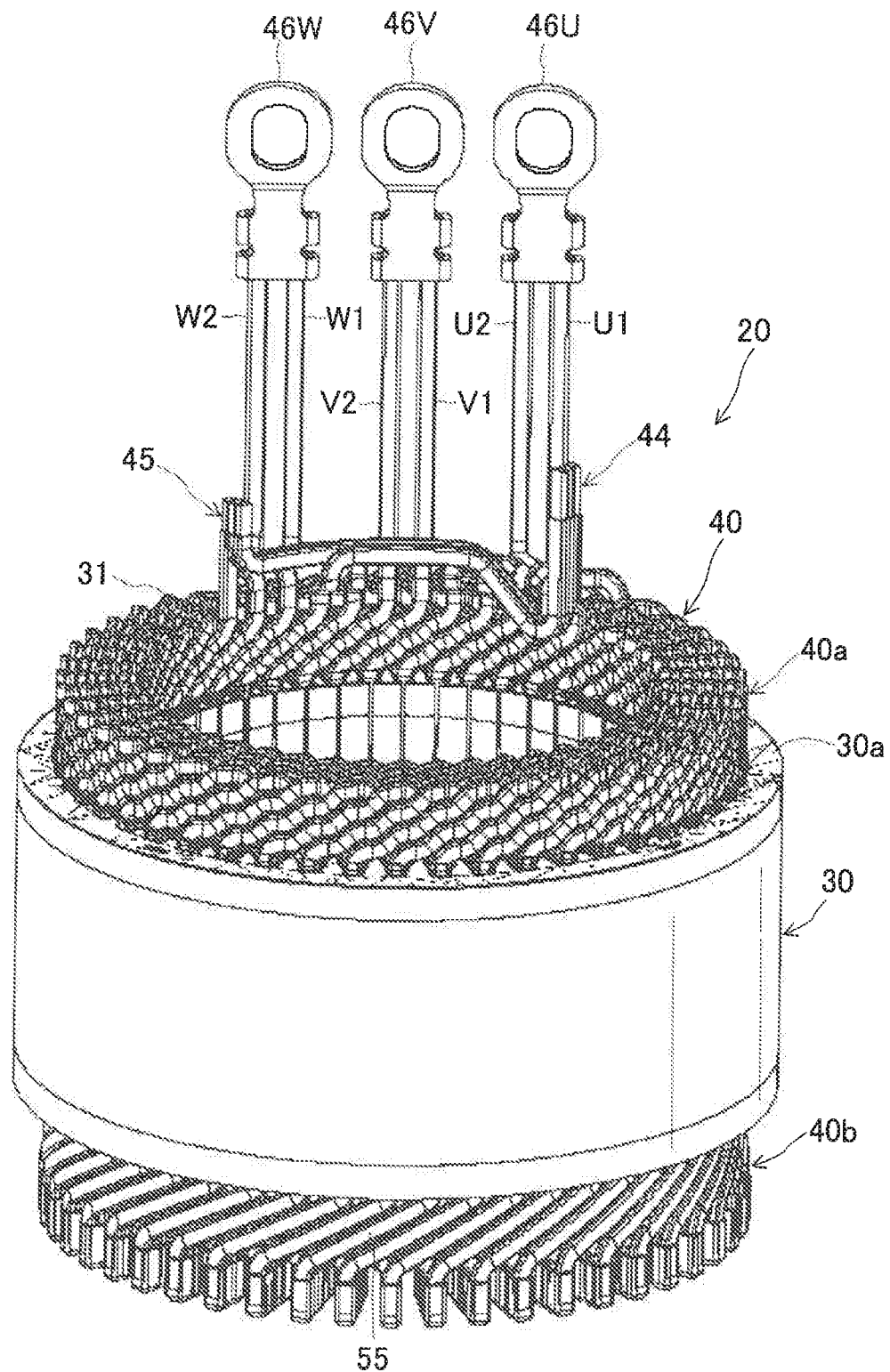
FIG. 2 is a perspective view of the stator according to the first embodiment.
Figure 3:
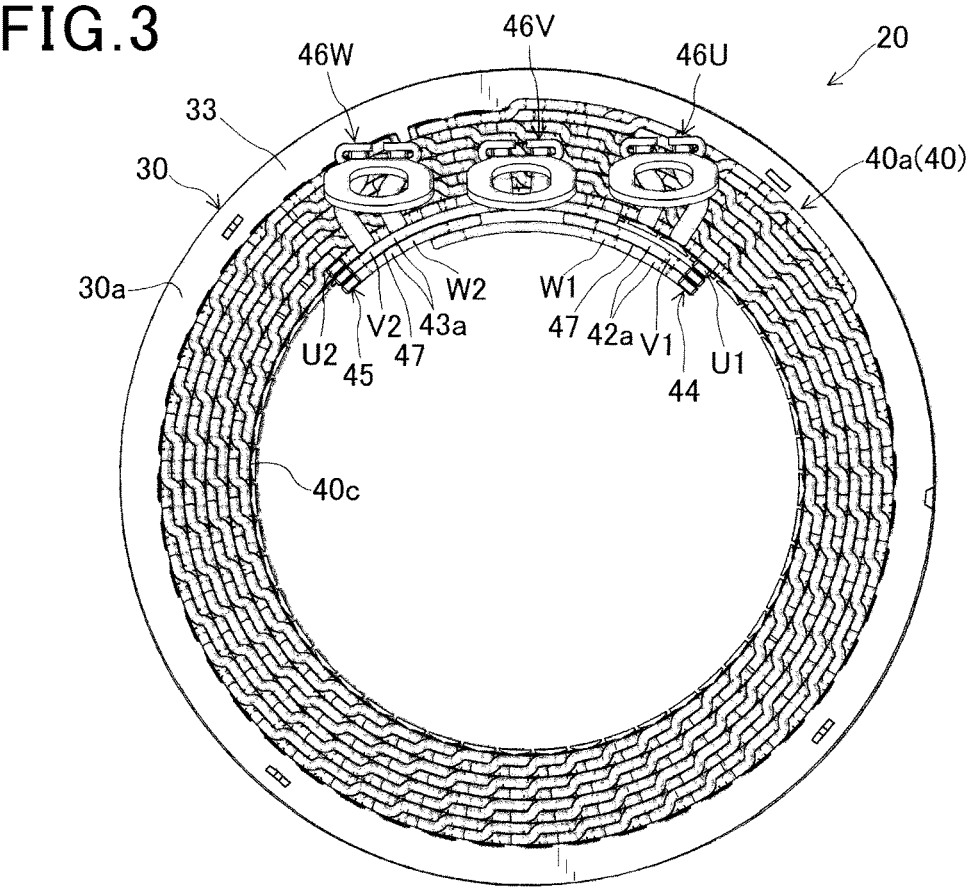
FIG. 3 is a plan view, along the axial direction, of the stator according to the first embodiment.
Figure 4:
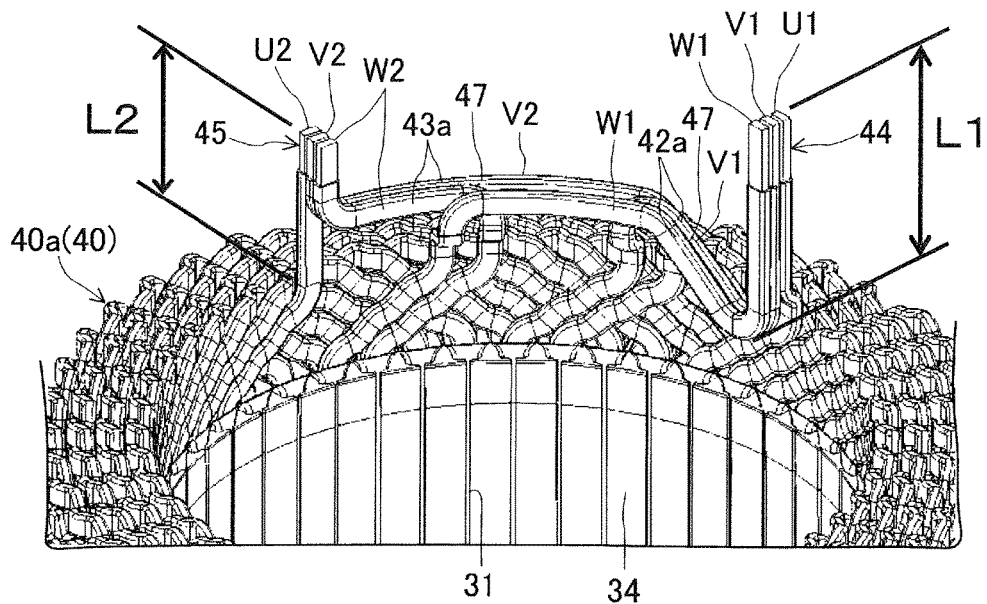
FIG. 4 is a perspective view of part of the stator according to the first embodiment.

Referring now to FIGS. 2-4, the stator core 30 has a plurality of slots 31 arranged in a circumferential direction thereof. The stator coil 40 is comprised of a U-phase winding 41U, a V-phase winding 41V and a W-phase winding 41W that are mounted on the stator core 30 so as to be received in the slots 31 of the stator core 30 and be different in electrical phase from each other.

In the present embodiment, the stator core 30 is formed by laminating a plurality of annular magnetic steel sheets in the axial direction of the stator core 30 and fixing them together by, for example, staking. In addition, between each adjacent pair of the magnetic steel sheets, there is interposed an insulating film. It should be appreciated that other conventional metal sheets may also be used instead of the magnetic steel sheets.

Moreover, the stator core 30 includes an annular back core 33 and a plurality of teeth 34 in addition to the aforementioned slots 31. The teeth 34 each protrude radially inward from the back core 33 and are circumferentially spaced at a predetermined pitch. Each of the slots 31 is formed between one circumferentially-adjacent pair of the teeth 34. Accordingly, the slots 31 are circumferentially arranged at the same predetermined pitch as the teeth 34. Moreover, each of the slots 31 extends in the axial direction of the stator core 30 to axially penetrate the stator core 30 and opens on the radially inner surface of the stator core 30. For each of the slots 31, the depth direction of the slot 31 coincides with a radial direction of the stator core 30. In addition, in the present embodiment, the number of the slots 31 per magnetic pole of the rotor 14 and per phase of the stator coil 40 is equal to 2.

Figure 5:
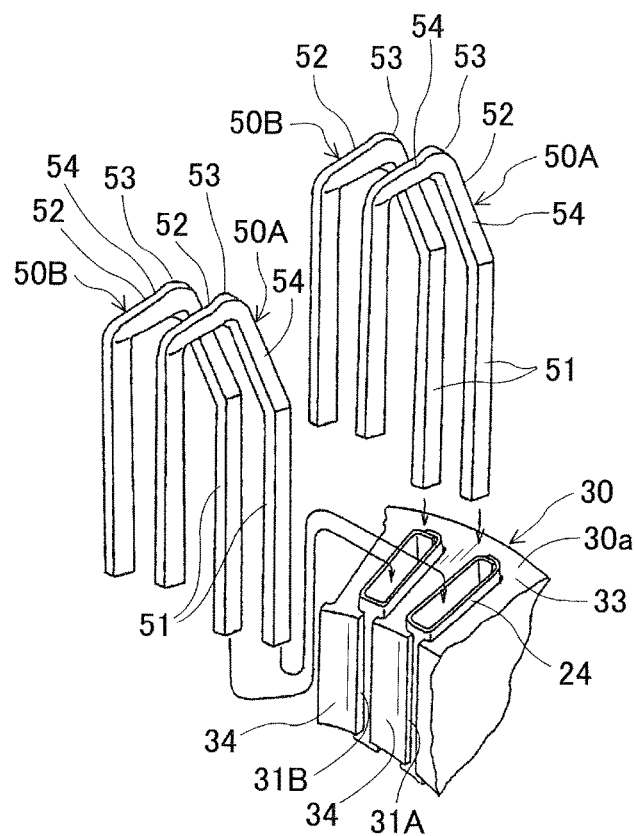
FIG. 5 is a schematic view illustrating the manner of inserting electric wire segments forming a stator coil into slots of a stator core of the stator according to the first embodiment.

In the present embodiment, the stator coil 40 is formed by first mounting a plurality of substantially U-shaped electric wire segments 50 as shown in FIG. 5 to the stator core 30 and then joining each corresponding pair of open ends (or free distal ends) of the electric wire segments 50 by welding.

Figure 6:
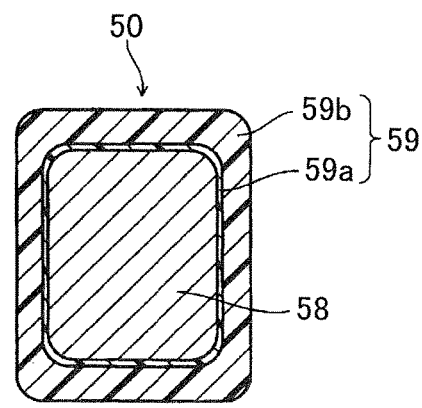
FIG. 6 is a cross-sectional view illustrating the configuration of the electric wire segments forming the stator coil of the stator according to the first embodiment.

Referring to FIG. 6, each of the electric wire segments 50 is obtained by cutting and bending an electric wire that includes an electric conductor 58 and an insulating coat 59 that covers the outer surface of the electric conductor 58. The electric conductor 58 is made of an electrically conductive material, such as copper or aluminum, and has a substantially rectangular cross section. The insulating coat 59 is two-layer structured to include an inner coat 59a and an outer coat 59b that is formed outside the inner coat 59a. The inner coat 59a may be formed, for example, of a polyimide (PI) or polyamide-imide (PAID) resin. On the other hand, the outer coat 59b may be formed, for example, of a polyether ether ketone (PEEK) resin. In addition, it should be noted that the insulating coat 59 may also be single-layer structured.

Referring back to FIG. 5, each of the electric wire segments 50 is substantially U-shaped to have a pair of straight portions 51 extending parallel to each other and a turn portion 52 connecting ends of the straight portions 51 on the same side. The turn portion 52 has an apex part 53 formed at the center of the turn portion 52 so as to extend parallel to a corresponding one of axial end faces 30a of the stator core 30. The turn portion 52 also has a pair of oblique parts 54 formed respectively on opposite sides of the apex part 53 so as to extend obliquely at a predetermined angle with respect to the corresponding axial end face 30a of the stator core 30. In addition, the stator 30 further includes insulators 24 that are provided between the stator core 30 and the electric wire segments 50 so as to electrically insulate them from each other.

In the present embodiment, as shown in FIG. 5, the electric wire segments 50 forming the stator coil 40 include a plurality of pairs of first and second electric wire segments 50A and 50B. For each pair of the first and second electric wire segments 50A and 50B, the straight portions 51 of the first electric wire segment 50A are inserted, from a first axial side (i.e., the upper side in FIG. 5) of the stator core 30, into different ones of the slots 31 of the stator core 30 from those of the second electric wire segment 50B. More specifically, the slots 31 in which the straight portions 51 of the first electric wire segment 50A are inserted are respectively adjacent to and belong to the same phase as those in which the straight portions 51 of the second electric wire segment 50B are inserted.

For example, for that pair of the first and second electric wire segments 50A and 50B which is shown on the right upper side in FIG. 5, the first electric wire segment 50A has its right-side straight portion 51 inserted in the eighth layer (i.e., the radially outermost layer) of one slot 31A and its left-side straight portion 51 inserted in the seventh layer of another slot (not shown) that is positioned counterclockwise of the slot 31A by one magnetic pole pitch (i.e., a pitch between the N and S poles of the rotor 14). On the other hand, the second electric wire segment 50B has its right-side straight portion 51 inserted in the eighth layer of one slot 31B that is positioned counterclockwise of and immediately adjacent to the slot 31A and its left-side straight portion 51 inserted in the seventh layer of another slot (not shown) that is positioned counterclockwise of the slot 31B by one magnetic pole pitch. That is, the first and second electric wire segments 50A and 50B are circumferentially offset from each other by one slot pitch.

In addition, in each of the slots 31 of the stator core 30, there are inserted an even number of the straight portions 51 of the electric wire segments 50. More specifically, in the present embodiment, in each of the slots 31 of the stator core 30, there are inserted eight straight portions 51 of the electric wire segments 50 so as to be radially stacked in eight layers in the slot 31.

For each of the electric wire segments 50, free end parts of the straight portions 51 of the electric wire segment 50, which protrude outside of the corresponding slots 31 on a second axial side (i.e., the lower side in FIG. 5) of the stator core 30, are twisted respectively toward opposite sides in the circumferential direction of the stator core 30 so as to extend obliquely at a predetermined angle with respect to the corresponding axial end face 30a of the stator core 30. Consequently, each of the free end parts of the straight portions 51 is transformed into an oblique part 55 that extends in the circumferential direction of the stator core 30 for substantially half a magnetic pole pitch (see FIG. 2).

Further, on the second axial side of the stator core 30, each corresponding pair of the oblique parts 55 of the electric wire segments 50 are welded at their respective distal ends, thereby being electrically connected to each other. More specifically, for each phase winding of the three-phase stator coil 40, all the electric wire segments 50 which together constitute the phase winding are electrically connected in series with one another. As a result, each phase winding of the stator coil 40 is spirally wave-wound around the stator core 30 by, for example, eight turns (or eight circle rounds) in the circumferential direction of the stator core 30. Thereafter, an insulation treatment is performed, for example using powder resin, on the welds (or joints) each of which is formed between one corresponding pair of the oblique parts 55 of the electric wire segments 50.

In addition, each phase winding of the stator coil 40 further includes, in addition to the substantially U-shaped electric wire segments 50 as shown in FIG. 5, other electric wire segments of different shapes (not shown). These other electric wire segments include: electric wire segments each being connected with one input/output lead wire or neutral lead wire; and electric wire segments each having a turn portion connecting two consecutive turns (e.g., the first and second turns) of the phase winding.

Figure 7:
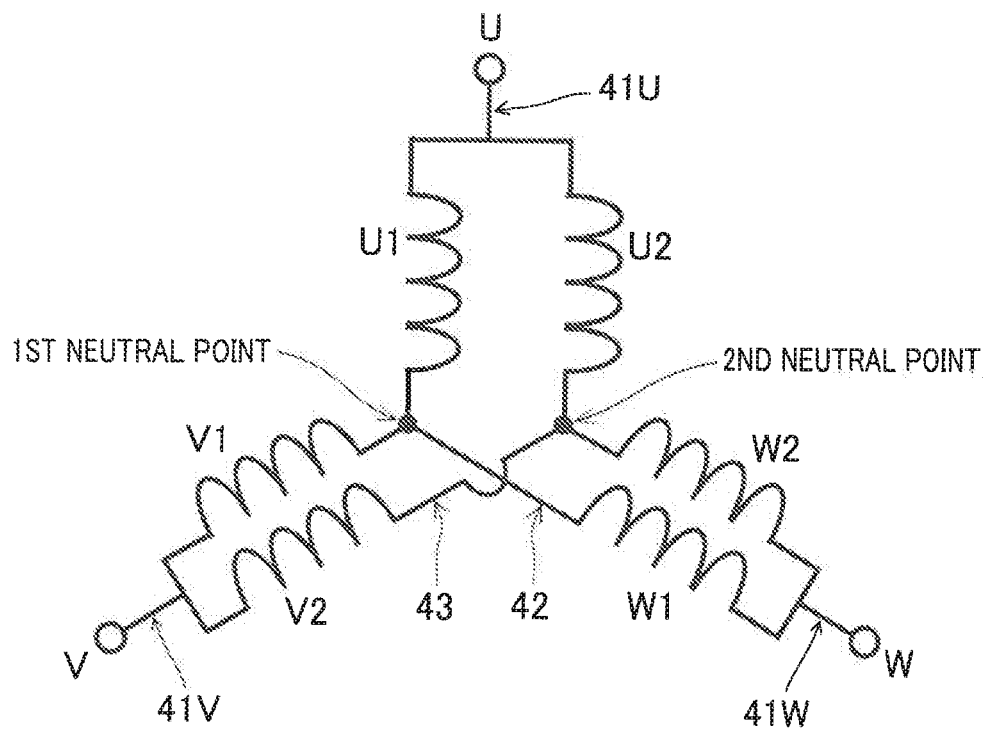
FIG. 7 is a schematic connection diagram of the stator coil of the stator according to the first embodiment.

As shown in FIG. 7, in the present embodiment, the stator coil 40 consists of a first three-phase coil 42 and a second three-phase coil 43 that are connected in parallel with each other. The first three-phase coil 42 is comprised of a first U-phase winding U1, a first V-phase winding V1 and a first W-phase winding W1 that are star-connected (or Y-connected) with each other. The second three-phase coil 43 is comprised of a second U-phase winding U2, a second V-phase winding V2 and a second W-phase winding W2 that are star-connected with each other.

That is, the U-phase winding 41U of the stator coil 40 consists of the first and second U-phase windings U1 and U2 that are connected in parallel with each other. The V-phase winding 41V of the stator coil 40 consists of the first and second V-phase windings V1 and V2 that are connected in parallel with each other. The W-phase winding 41W of the stator coil 40 consists of the first and second W-phase windings W1 and W2 that are connected in parallel with each other.

Moreover, as shown in FIGS. 2-4, the first three-phase coil 42 includes a first joint 44 where a distal end of a neutral lead wire of the first U-phase winding U1, a distal end of a neutral lead wire of the first V-phase winding V1 and a distal end of a neutral lead wire of the first W-phase winding W1 are joined to one another. Similarly, the second three-phase coil 43 includes a second joint 45 where a distal end of a neutral lead wire of the second U-phase winding U2, a distal end of a neutral lead wire of the second V-phase winding V2 and a distal end of a neutral lead wire of the second W-phase winding W2 are joined to one another. The first and second joints 44 and 45 respectively define (or form) first and second neutral points of the stator coil 40 as shown in FIG. 7.

As shown in FIG. 2, the stator coil 40 has an annular first coil end part 40a on the first axial side (i.e., the upper side in FIG. 2) of the stator core 30 and an annular second coil end part 40b on the second axial side (i.e., the lower side in FIG. 2) of the stator core 30. The first coil end part 40a is constituted of the turn portions 52 of the electric conductor segments 50 which protrude from the corresponding (i.e., the first) axial end face 30a of the stator core 30. The second coil end part 40b is constituted of the oblique parts 55 of the electric wire segments 50, which protrude from the corresponding (i.e., the second) axial end face 30a of the stator core 30, and the joints formed between the oblique parts 55.

As shown in FIGS. 2 and 3, input/output lead wires of the first and second U-phase windings U1 and U2, the first and second V-phase windings V1 and V2 and the first and second W-phase windings W1 and W2 are led out from a radially outer periphery of the first coil end part 40*a* of the stator coil 40. Moreover, a terminal member 46U is attached and thereby electrically connected to both distal ends of the input/output lead wires of the first and second U-phase windings U1 and U2. A terminal member 46V is attached and thereby electrically connected to both distal ends of the input/output lead wires of the first and second V-phase windings V1 and V2. A terminal member 46W is attached and thereby electrically connected to both distal ends of the input/output lead wires of the first and second W-phase windings W1 and W2. In addition, the terminal members 46U, 46V and 46W are to be electrically connected to an external circuit (not shown).

On the other hand, the neutral lead wires of the first and second U-phase windings U1 and U2, the first and second V-phase windings V1 and V2 and the first and second W-phase windings W1 and W2 are led out from a radially inner periphery of the first coil end part 40*a* of the stator coil 40. Moreover, as described previously, the distal ends of the neutral lead wires of the first U-phase, V-phase and W-phase windings U1, V1 and W1 are joined at the first joint 44; the distal ends of the neutral lead wires of the second U-phase, V-phase and W-phase windings U2, V2 and W2 are joined at the second joint 45. Both the first and second joints 44 and 45 are arranged radially inside the first coil end part 40*a* of the stator coil 40. With this arrangement, it becomes possible to reduce the extending lengths of the neutral lead wires of the first and second phase windings U1-W1 and U2-W2, thereby setting the natural frequencies of the neutral lead wires to be outside of the range of a normal frequency in the vehicle.

In addition, the normal frequency here denotes the frequency of vibration that is caused to components provided in the vehicle accompanying vibration of an engine of the vehicle. The normal frequency can be determined by the following equation:

$$f = S \times (N\text{max}/60) \times (C/St)$$

where f is the normal frequency in Hz, Nmax is the maximum rotational speed of the engine in rpm, C is the number of cylinders or the number of rotors of the engine, St is a constant dependent on the type of the engine (e.g., equal to 1 in the case of the engine being a two-stroke engine or a rotary engine and 2 in the case of the engine being a four-stroke engine), and S is a design-dependent coefficient (e.g., equal to 2).

In the present embodiment, as shown in FIG. 4, the neutral lead wires of the first U-phase, V-phase and W-phase windings U1, V1 and W1, which are joined at the first joint 44, are different in extending length in the circumferential direction of the stator core 30 from each other. More specifically, the extending lengths of the neutral lead wires of the first U-phase, V-phase and W-phase windings U1, V1 and W1 in the circumferential direction of the stator core 30 increase in the order of U1, V1 and W2. Moreover, adjoining portions 42*a* of the neutral lead wires of the first V-phase and W-phase windings V1 and W1 are fixedly bonded into one piece by a resin member 47; the adjoining portions 42*a* radially overlap and adjoin each other. Here, the neutral lead wire of the first W-phase winding W1 has a greater extending length in the circumferential direction of the stator core 30 and thus a lower natural frequency than the neutral lead wire of the first V-phase winding V1. Consequently, with the adjoining portions 42*a* fixedly bonded into one piece, the natural frequency of the neutral lead wire of the first W-phase winding W1 is raised in conformity to the natural frequency of the neutral lead wire of the first V-phase winding V1, thereby setting the natural frequency of an integrated body consisting of the neutral lead wires of the first V-phase and W-phase windings V1 and W1 to be outside the range of the normal frequency in the vehicle.

Similarly, the neutral lead wires of the second U-phase, V-phase and W-phase windings U2, V2 and W2, which are joined at the second joint 45, are also different in extending length in the circumferential direction of the stator core 30 from each other. More specifically, the extending lengths of the neutral lead wires of the second U-phase, V-phase and W-phase windings U2, V2 and W2 in the circumferential direction of the stator core 30 increase in the order of U2, W2 and V2. Moreover, adjoining portions 43*a* of the neutral lead wires of the second V-phase and W-phase windings V2 and W2 are fixedly bonded into one piece by a resin member 47; the adjoining portions 43*a* radially overlap and adjoin each other. Here, the neutral lead wire of the second V-phase winding V2 has a greater extending length in the circumferential direction of the stator core 30 and thus a lower natural frequency than the neutral lead wire of the second W-phase winding W2. Consequently, with the adjoining portions 43*a* fixedly bonded into one piece, the natural frequency of the neutral lead wire of the second V-phase winding V2 is raised in conformity to the natural frequency of the neutral lead wire of the second W-phase winding W2, thereby setting the natural frequency of an integrated body consisting of the neutral lead wires of the second V-phase and W-phase windings V2 and W2 to be outside the range of the normal frequency in the vehicle.

In the present embodiment, as shown in FIG. 4, the adjoining portions 42*a* and 43*a* as well as the first and second joints 44 and 45 are arranged to protrude radially inward from a radially-inner peripheral surface 40*c* of the first coil end part 40*a* of the stator coil 40.

Moreover, the neutral lead wires of the first U-phase, V-phase and W-phase windings U1, V1 and W1 joined at the first joint 44 extend (or protrude) axially outward from an axial end face 40*d* of the first coil end part 40*a* of the stator coil 40 for a first length L1. The neutral lead wires of the second U-phase, V-phase and W-phase windings U2, V2 and W2 joined at the second joint 45 extend axially outward from the axial end face 40*d* of the first coil end part 40*a* of the stator coil 40 for a second length L2. The first and second lengths L1 and L2 are set to be different from each other. More particularly, in the present embodiment, the first length L1 is set to be greater than the second length L2. Consequently, the natural frequency of the first joint 44 formed between the distal ends of the neutral lead wires of the first U-phase, V-phase and W-phase windings U1, V1 and W1 and the natural frequency of the second joint 45 formed between the distal ends of the neutral lead wires of the second U-phase, V-phase and W-phase windings U2, V2 and W2 are set to be different from each other, thereby preventing occurrence of resonance between the first and second joints 44 and 45.

In addition, in the present embodiment, in assembling the rotor 14 and the stator 20, the rotor 14 is axially inserted into the radially inside of the stator 20 from the second coil end part 40*b* side (i.e., the lower side in FIG. 2). Consequently, though the adjoining portions 42*a* and 42*b* and the first and second joints 44 and 45 protrude radially inward from the radially-inner peripheral surface 40*c* of the first coil end part 40*a* of the stator coil 40, it is still possible to assemble the rotor 14 and the stator 20 without interference therebetween.

The above-described stator 20 according to the present embodiment has the following advantages.

Figure 3A:
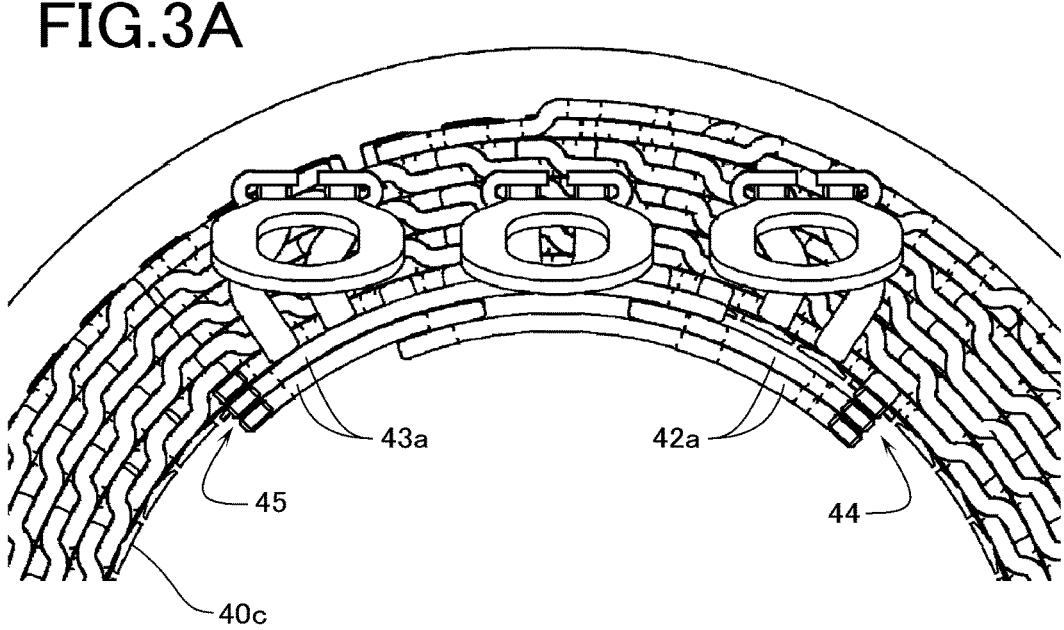
FIG. 3A is an enlargement of a portion of FIG. 3.

In the present embodiment, each of the neutral lead wires is connected (or formed integrally) with one of the phase windings U1-W1 and U2-W2 of the stator coil 40 and led out from the radially inner periphery of the first coil end part 40a of the stator coil 40. The adjoining portions 42a of the neutral lead wires of the first V-phase and W-phase windings V1 and W1 adjoin each other. The adjoining portions 43a of the neutral lead wires of the second V-phase and W-phase windings V2 and W2 adjoin each other. At the first joint 44, the distal ends of the neutral lead wires of the first U-phase, V-phase and W-phase windings U1, V1 and W1 are joined to one another. At the second joint 45, the distal ends of the neutral lead wires of the second U-phase, V-phase and W-phase windings U2, V2 and W2 are joined to one another. As shown in FIG. 3 and FIG. 3A, all of the adjoining portions 42a and 43a and the first and second joints 44 and 45 are arranged radially inside the radially-inner peripheral surface 40c of the first coil end part 40a of the stator coil 40.

With the above arrangement, it is possible to minimize the extending lengths and thus the weights of the neutral lead wires of the phase windings U1-W1 and U2-W2 of the stator coil 40. Consequently, it is possible to set the natural frequencies of the neutral lead wires of the phase windings U1-W1 and U2-W2 to be outside the range of the normal frequency in the vehicle. As a result, it is possible to reduce stress induced in the first and second joints 44 and 45 due to vibration in the vehicle, thereby preventing failure (e.g., breakage or disconnection) of the first and second joints 44 and 45.

Moreover, in the present embodiment, at the first joint 44, there are joined the distal ends of the neutral lead wires of three windings of different phases (i.e., the first U-phase, V-phase and W-phase windings U1, V1 and W1). At the second joint 45, there are also joined the distal ends of the neutral lead wires of three windings of different phases (i.e., the second U-phase, V-phase and W-phase windings U2, V2 and W2).

With the above configuration, it is possible to allow at least three of the neutral lead wires of the phase windings U1-W1 and U2-W2 to be led out from the radially inner periphery of the first coil end part 40a of the stator coil 40, thereby reducing the lengths of the neutral lead wires that extend beyond the axial height of the first coil end part 40a. Consequently, it is possible to more reliably set the natural frequencies of the neutral lead wires of the phase windings U1-W1 and U2-W2 to be outside the range of the normal frequency in the vehicle. As a result, it is possible to more reliably reduce stress induced in the first and second joints 44 and 45 due to vibration in the vehicle, thereby more reliably preventing failure of the first and second joints 44 and 45.

In the present embodiment, the adjoining portions 42a of the neutral lead wires of the first V-phase and W-phase windings V1 and W1 are fixedly bonded into one piece by the resin member 47; the neutral lead wire of the first W-phase winding W1 has a greater extending length and thus a lower natural frequency than the neutral lead wire of the first V-phase winding V1. The adjoining portions 43a of the neutral lead wires of the second V-phase and W-phase windings V2 and W2 are also fixedly bonded into one piece by the resin member 47; the neutral lead wire of the second V-phase winding V2 has a greater extending length and thus a lower natural frequency than the neutral lead wire of the second W-phase winding W2.

With the above configuration, the natural frequency of the neutral lead wire of the first W-phase winding W1 is raised in conformity to the natural frequency of the neutral lead wire of the first V-phase winding V1, thereby setting the natural frequency of the integrated body consisting of the neutral lead wires of the first V-phase and W-phase windings V1 and W1 to be outside the range of the normal frequency in the vehicle. The natural frequency of the neutral lead wire of the second V-phase winding V2 is raised in conformity to the natural frequency of the neutral lead wire of the second W-phase winding W2, thereby setting the natural frequency of the integrated body consisting of the neutral lead wires of the second V-phase and W-phase windings V2 and W2 to be outside the range of the normal frequency in the vehicle. Consequently, it is possible to more reliably reduce stress induced in the first and second joints 44 and 45 due to vibration in the vehicle, thereby more reliably preventing failure of the first and second joints 44 and 45.

In the present embodiment, the neutral lead wires of the first U-phase, V-phase and W-phase windings U1, V1 and W1 joined at the first joint 44 extend axially outward from the axial end face 40d of the first coil end part 40a of the stator coil 40 for the first length L1. The neutral lead wires of the second U-phase, V-phase and W-phase windings U2, V2 and W2 joined at the second joint 45 extend axially outward from the axial end face 40d of the first coil end part 40a of the stator coil 40 for the second length L2. The first and second lengths L1 and L2 are set to be different from each other.

With the above configuration, the natural frequencies of the first and second joints 44 and 45 are set to be different from each other, thereby preventing occurrence of resonance between the first and second joints 44 and 45. Consequently, it is possible to more reliably reduce stress induced in the first and second joints 44 and 45 due to vibration in the vehicle, thereby more reliably preventing failure of the first and second joints 44 and 45.

Second Embodiment

A stator 20 according to a second embodiment has almost the same structure as the stator 20 according to the first embodiment. Therefore, the differences of the stator 20 according to the second embodiment from the stator 20 according to the first embodiment will be mainly described hereinafter.

Figure 8:
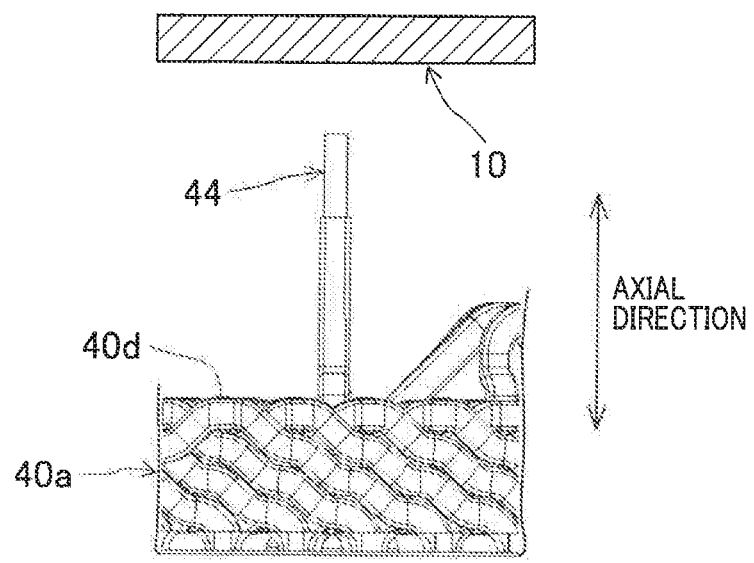
FIG. 8 is a schematic view illustrating a first joint of a stator coil of a stator according to a second embodiment before an elastic member is mounted on the first joint.

In the present embodiment, as shown in FIG. 8, the neutral lead wires of the first U-phase, V-phase and W-phase windings U1, V1 and W1 are arranged to extend axially outward from the axial end face 40d of the first coil end part 40a of the stator coil 40, so that the first joint 44, where the distal ends of the neutral lead wires of the windings U1, V1 and W1 are joined, is located at a position away from an inner surface of an axial end wall of the housing 10 by a predetermined distance.

Figure 9:
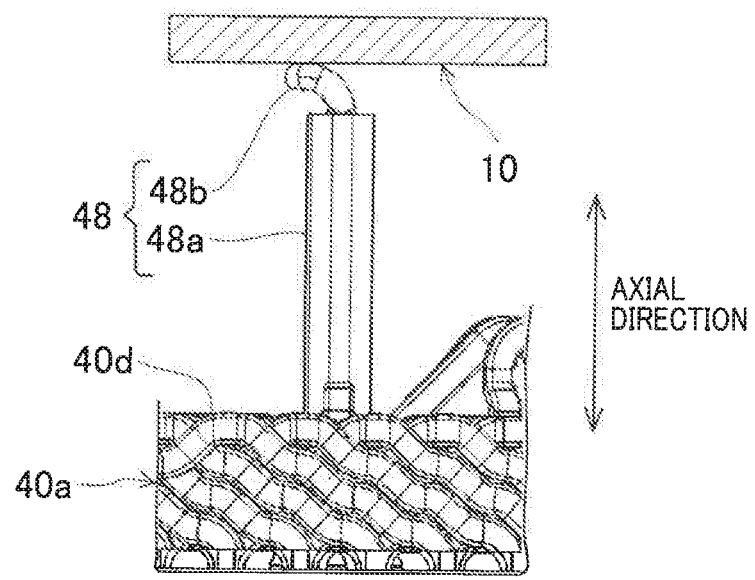
FIG. 9 is a schematic view illustrating the elastic member mounted on the first joint of the stator coil of the stator according to the second embodiment.

Moreover, as shown in FIG. 9, an elastic member 48 is mounted on the first joint 44. The elastic member 48 includes a main body portion 48a and an elastic supporting portion 48b. The main body portion 48a covers an outer periphery of the neutral lead wires of the first U-phase, V-phase and W-phase windings U1, V1 and W1 joined at the first joint 44. The elastic supporting portion 48b protrudes from a distal end of the main body portion 48a and has its distal end arranged in pressure contact with the inner surface of the axial end wall of the housing 10. That is, with the elastic supporting portion 48b arranged in pressure contact with the inner surface of the axial end wall of the housing 10, the elastic member 48 elastically supports the distal ends of the neutral lead wires of the first U-phase, V-phase and W-phase windings U1, V1 and W1 joined at the first joint 44.

The elastic member 48 may be formed of a well-known elastic material, such as rubber or resin.

In addition, in the present embodiment, though not shown in the figures, the second joint 45 also has an elastic member 48 mounted thereon. The elastic member 48 mounted on the second joint 45 has the same structure and arrangement as the elastic member 48a mounted on the first joint 44. Therefore, for the sake of avoiding redundancy, description of the elastic member 48 mounted on the second joint 45 is omitted hereinafter.

The stator 20 according to the present embodiment has the same advantages as the stator 20 according to the first embodiment.

Moreover, in the stator 20 according to the present embodiment, on each of the first and second joints 44 and 45, there is mounted the elastic member 48 that is arranged in abutment with (more specifically, in pressure contact with) the inner surface of the axial end wall of the housing 10. Therefore, each of the neutral lead wires of the phase windings U1-W1 and U2-W2 is supported on the distal side (i.e., the side of the respective one of the first and second joints 44 and 45) as well as on the proximal side (i.e., the first coil end part 40a side). Consequently, it is possible to more reliably set the natural frequencies of the neutral lead wires of the phase windings U1-W1 and U2-W2 to be outside the range of the normal frequency in the vehicle. As a result, it is possible to more reliably reduce stress induced in the first and second joints 44 and 45 due to vibration in the vehicle, thereby more reliably preventing failure (e.g., breakage or disconnection) of the first and second joints 44 and 45.

Third Embodiment

A stator 20 according to a third embodiment has almost the same structure as the stator 20 according to the second embodiment. Therefore, the differences of the stator 20 according to the third embodiment from the stator 20 according to the second embodiment will be mainly described hereinafter.

Figure 10:
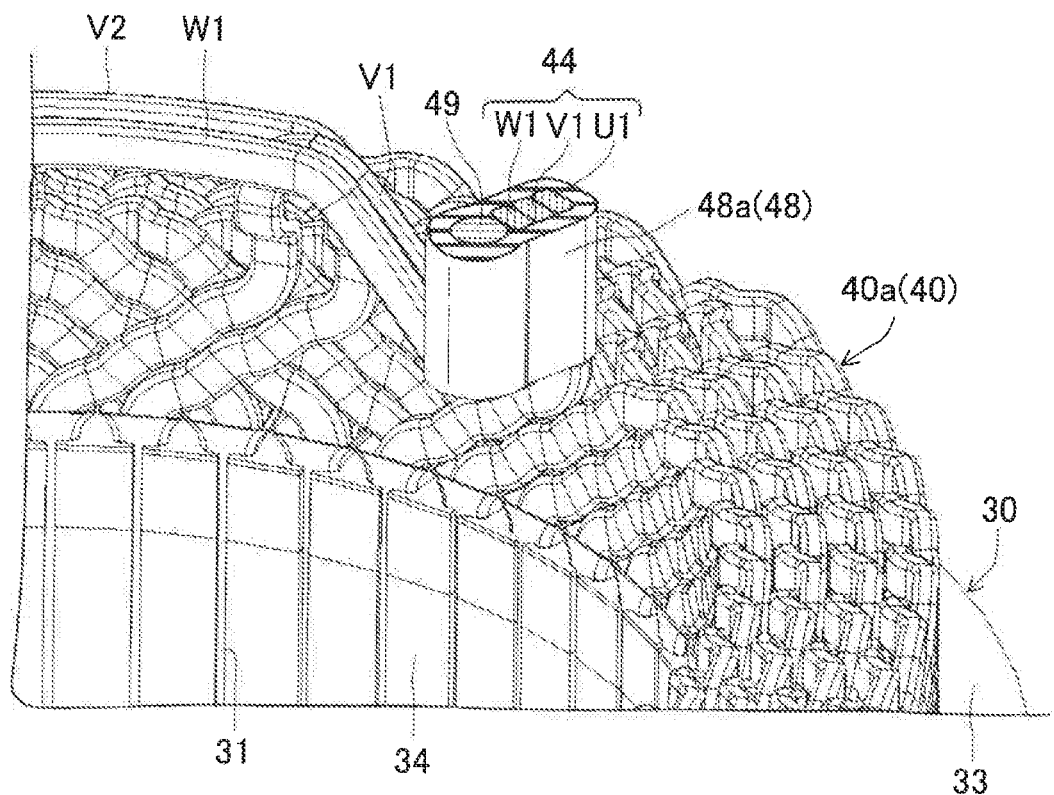
FIG. 10 is a schematic view illustrating a temperature-sensing element arranged between an elastic member and a first joint of a stator coil in a stator according to a third embodiment.

In the present embodiment, as shown in FIG. 10, a temperature-sensing element 49 is arranged between the first joint 44 and the elastic member 48 mounted on the first joint 44. The temperature-sensing element 49 senses the temperature of the stator coil 40, which generates heat during operation of the rotating electric machine 1, at the first joint 44 and outputs a signal indicative of the sensed temperature to a not-shown controller. The controller detects failure (e.g., breakage or disconnection) of the first joint 44 by monitoring the temperature sensed by the temperature-sensing element 49.

On the other hand, no temperature-sensing element is arranged between the second joint 45 and the elastic member 48 mounted on the second joint 45. In addition, in the present embodiment, the elastic members 48 mounted on the first and second joints 44 and 45 are formed of a material (e.g., rubber or resin) having a lower thermal conductivity than the electric conductors (e.g., copper or aluminum) of the neutral lead wires of the phase windings U1-W1 and U2-W2.

The stator 20 according to the present embodiment has the same advantages as the stator 20 according to the second embodiment.

Moreover, in the stator 20 according to the present embodiment, there is arranged the temperature-sensing element 49 between the first joint 44 and the elastic member 48 mounted on the first joint 44. Therefore, if failure of the first joint 44 occurs due to resonance with vibration of the vehicle engine, it is possible for the controller to detect the failure by monitoring the temperature sensed by the temperature-sensing element 49. Further, with the elastic members 48 formed of a material having a lower thermal conductivity than the electric conductors of the neutral lead wires, it is possible to ensure high accuracy of the detection of failure of the first joint 44.

In addition, in the present embodiment, the first length L1 is set to be greater than the second length L2 as in the first embodiment (see FIG. 4). That is, the neutral lead wires of the phase windings U1-W1 joined at the first joint 44 have a greater axial length and thus a lower resonant frequency than the neutral lead wires of the phase windings U2-W2 joined at the second joint 45. Therefore, of the first and second joints 44 and 45, it is preferable to arrange the temperature-sensing element 49 between the first joint 44 and the elastic member 48 mounted on the first joint 44.

While the above particular embodiments have been shown and described, it will be understood by those skilled in the art that the present invention can also be embodied in various other modes without departing from the spirit of the present invention.

For example, in the above-described embodiments, all of the adjoining portions 42a and 43a and the first and second joints 44 and 45 are arranged radially inside the radially-inner peripheral surface 40c of the first coil end part 40a of the stator coil 40.

Figure 11:
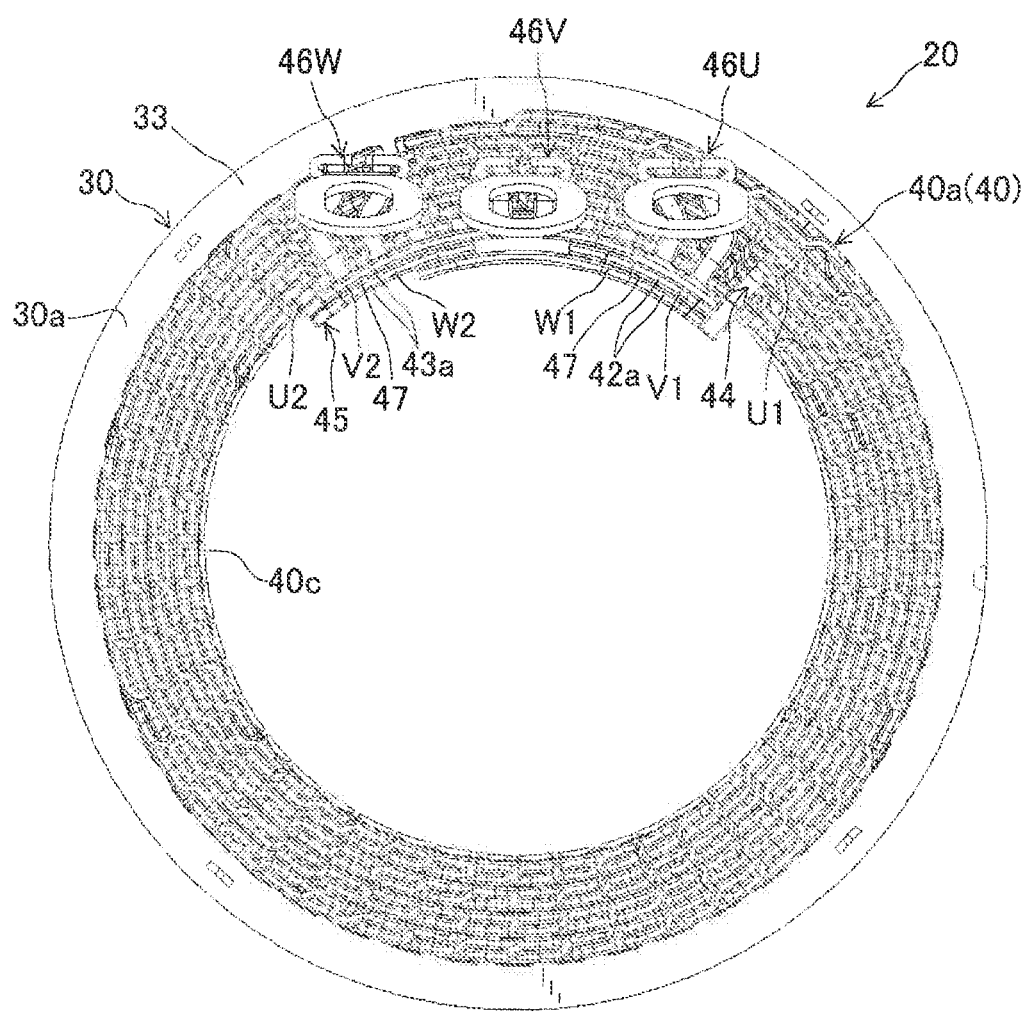
FIG. 11 is a plan view, along the axial direction, of a stator according to a modification.
Figure 12:
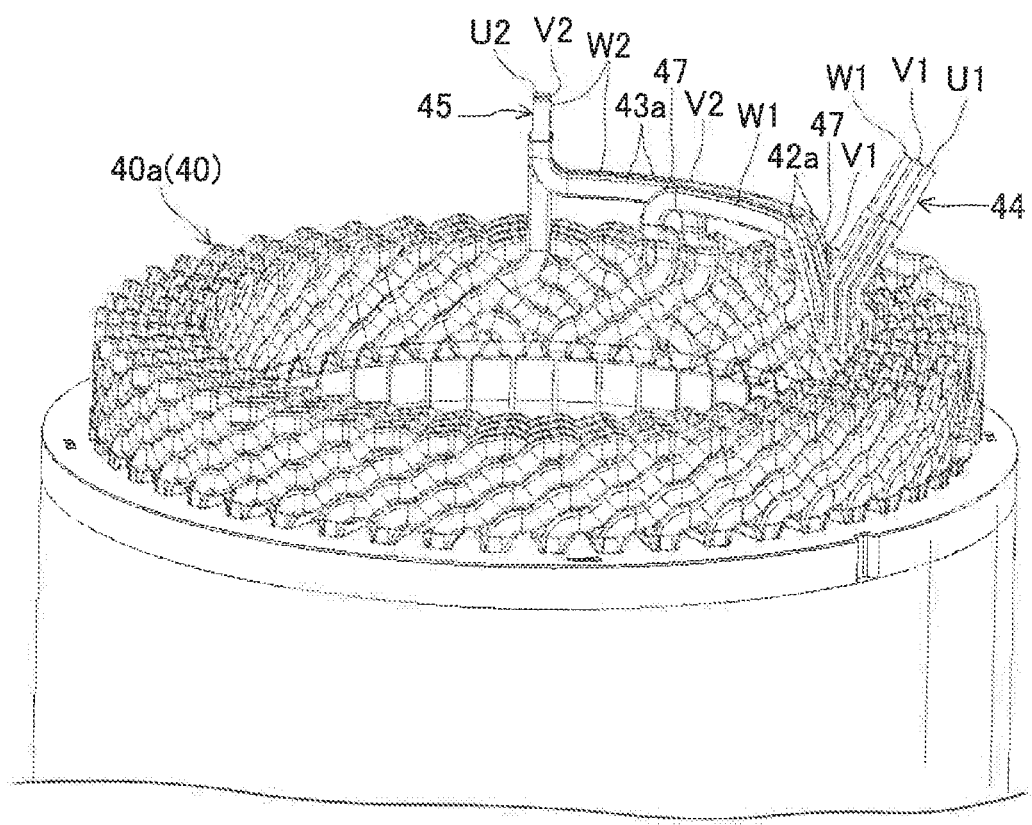
FIG. 12 is a perspective view of part of the stator according to the modification.

However, at least one of the first and second joints 44 and 45 may be bent radially outward and thus not protrude radially inward from the radially-inner peripheral surface 40c of the first coil end part 40a. FIGS. 11 and 12 show an exemplary modification where of the first and second joints 44 and 45, only the first joint 44 is bent radially outward and thus does not protrude radially inward from the radially-inner peripheral surface 40c of the first coil end part 40a.

In the above-described embodiments, the number of the joints (i.e., the first and second joints 44 and 45) where the lead wires led out from the radially inner periphery of the first coil end part 40a are joined is equal to 2. However, the number of the joints where the lead wires led out from the radially inner periphery of the first coil end part 40a are joined may be equal to 1 or 3 or more.

In the above-described embodiments, the neutral lead wires of the phase windings U1-W1 and U2-W2 of the stator coil 40 are led out from the radially inner periphery of the first coil end part 40a and joined at the first and second joints 44 and 45 that are arranged radially inside the radially-inner peripheral surface 40c of the first coil end part 40a. However, instead of the neutral lead wires, the input/output lead wires of the phase windings U1-W1 and U2-W2 of the stator coil 40 may be led out from the radially inner periphery of the first coil end part 40a and joined at joints that are arranged radially inside the radially-inner peripheral surface 40c of the first coil end part 40a.

In the above-described embodiments, the present invention is directed to the stator 20 of the rotating electric machine 1 that is designed to be used in a motor vehicle as an electric motor. However, the present invention can also be applied to stators of other rotating electric machines, such as a stator of an electric generator or a stator of a motor-generator that can selectively function either as an electric motor or as an electric generator.

What is claimed is:

1. A stator for a rotating electric machine, the stator comprising:

an annular stator core having a plurality of slots arranged in a circumferential direction thereof; and a multi-phase stator coil comprised of a plurality of phase windings that are mounted on the stator core so as to be received in the slots of the stator core, the stator coil having an annular coil end part that protrudes axially outward from an axial end face of the stator core, wherein the stator coil includes, at least, two lead wires and a joint, each of the lead wires is connected with one of the phase windings of the stator coil and led out from a radially inner periphery of the coil end part, at the joint, distal ends of the lead wires are joined to each other, and adjoining portions of the lead wires, which adjoin each other, are arranged radially inside a radially-inner peripheral surface of the coil end part.

2. The stator as set forth in claim 1, wherein the joint is arranged radially inside the radially-inner peripheral surface of the coil end part.

3. The stator as set forth in claim 1, wherein the phase windings of the stator coil which are respectively connected with the lead wires belong to different phases.

4. The stator as set forth in claim 1, wherein extending lengths of the lead wires are different from each other, and the adjoining portions of the lead wires are fixed to each other by a resin member.

5. The stator as set forth in claim 1, wherein the stator coil includes first and second joints at each of which at least two lead wires are joined to each other, each of the lead wires being connected with one of the phase windings of the stator coil and led out from the radially inner periphery of the coil end part, the lead wires joined at the first joint extend axially outward from an axial end face of the coil end part of the stator coil for a first length, the lead wires joined at the second joint extend axially outward from the axial end face of the coil end part of the stator coil for a second length, and the first and second lengths are set to be different from each other.

6. The stator as set forth in claim 1, wherein an elastic member is mounted on the joint, and the elastic member is arranged in abutment with a housing of the rotating electric machine.

7. The stator as set forth in claim 6, wherein the elastic member is formed of a material having a lower thermal conductivity than electric conductors of the lead wires, and between the elastic member and the joint, there is arranged a temperature-sensing element to sense temperature at the joint.

* * * * *